United States Patent
De Picciotto

(10) Patent No.: US 10,484,625 B2
(45) Date of Patent: Nov. 19, 2019

(54) METHOD FOR REDUCING THE LOW-FREQUENCY COMPONENT OF THE MEASUREMENT NOISE OF A PHOTOSENSITIVE IMAGER AND APPLICATIONS OF SAME

(71) Applicant: MBDA FRANCE, Le-Plessis-Robinson (FR)

(72) Inventor: François De Picciotto, Paris (FR)

(73) Assignee: MBDA FRANCE, Le Plessis-Robinson (FR)

( * ) Notice: Subject to any disclaimer, the term of this patent is extended or adjusted under 35 U.S.C. 154(b) by 259 days.

(21) Appl. No.: 15/327,784

(22) PCT Filed: Jul. 15, 2015

(86) PCT No.: PCT/FR2015/000144
§ 371 (c)(1),
(2) Date: Jan. 20, 2017

(87) PCT Pub. No.: WO2016/016517
PCT Pub. Date: Feb. 4, 2016

(65) Prior Publication Data
US 2017/0214865 A1   Jul. 27, 2017

(30) Foreign Application Priority Data

Jul. 30, 2014   (FR) .................................... 14 01756

(51) Int. Cl.
*H04N 5/349*   (2011.01)
*F41G 7/22*   (2006.01)

(52) U.S. Cl.
CPC ........... *H04N 5/349* (2013.01); *F41G 7/2253* (2013.01); *F41G 7/2293* (2013.01)

(58) Field of Classification Search
None
See application file for complete search history.

(56) References Cited

U.S. PATENT DOCUMENTS

| | | | |
|---|---|---|---|
| 5,389,791 A | 2/1995 | Passmore | |
| 5,717,208 A | 2/1998 | Woolaway, II | |
| 6,198,564 B1* | 3/2001 | Knight | F41G 7/2213 244/3.16 |
| 2006/0055936 A1* | 3/2006 | Yun | G01N 21/4795 356/479 |
| 2011/0037860 A1* | 2/2011 | Broekaert | G06T 5/50 348/208.1 |
| 2011/0122101 A1* | 5/2011 | Kurozuka | G02B 26/101 345/204 |

FOREIGN PATENT DOCUMENTS

EP   1301027 A1   4/2003

OTHER PUBLICATIONS

ISA/EP International Search Report dated Oct. 30, 2015 re PCT Application No. PCT/FR2015/000144, filed Jul. 15, 2015.

* cited by examiner

*Primary Examiner* — Clifford Hilaire
(74) *Attorney, Agent, or Firm* — Patrick J. Daugherty; Daugherty & Del Zoppo Co., LPA

(57) ABSTRACT

A method for reducing the low-frequency component of the measurement noise of a photosensitive imager and applications of same. The invention involves intentionally creating a non-straight scanning movement of the observed scene on the photosensitive matrix of the imager.

11 Claims, 4 Drawing Sheets

Figure 1:
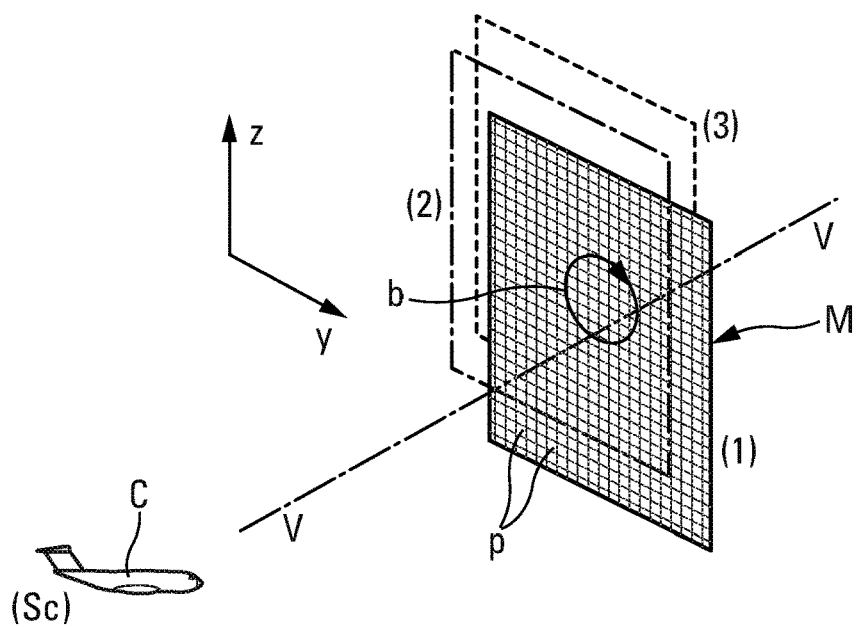

METHOD FOR REDUCING THE LOW-FREQUENCY COMPONENT OF THE MEASUREMENT NOISE OF A PHOTOSENSITIVE IMAGER AND APPLICATIONS OF SAME

The present invention relates to a method for reducing the low-frequency component of the measurement noise of an imager with a matrix of photosensitive pixels and its application to the improvement of homing devices for the final phase guidance of missiles towards a target.

Photosensitive imagers operating in a time-rated manner and comprising a matrix of photosensitive pixels sensitive to visible light or to infrared radiation are well known. It is also known that the cost of such imagers is higher the greater their resolution, i.e. that the size of said photosensitive pixels is smaller.

Furthermore, for certain applications (such as that of producing homing devices for missiles intended to be destroyed on initial use, for example) there is a cost advantage in using low-resolution photosensitive imagers.

However, a low-cost photosensitive imager, in addition to and because of its low resolution, has the disadvantage of generating a significant amount of temporal low-frequency measurement noise. Indeed, it is known that:

in such a matrix of photosensitive pixels the position of each pixel is determined by the coordinates of the centre of said pixel;

regardless of the position of an image point in a pixel, the position of this image point is considered to be that of the centre of said pixel;

consequently, upon each position measurement of said image point a spatial error occurs, which is the difference between the actual position of said image point and the position of the centre of the corresponding pixel; and that as and when images are captured by this pixel of said imager, the successive spatial errors on the position of said image point form a temporal series of spatial errors of position measurements forming said low-frequency measurement noise.

Of course, such a measurement noise can be eliminated by high time constant filtering, but the reaction time of the missile is then increased, which is disadvantageous for the shorter approach distance of the target.

The object of the present invention is to overcome these disadvantages by allowing a low-cost photosensitive imager to be improved by reducing the low-frequency component of its measurement noise.

To this end, according to the invention the method for reducing the low-frequency component of the measurement noise of a photosensitive imager operating in a time-rated manner at a frequency 1/T and comprising a matrix of photosensitive pixels observing a scene, is noteworthy in that:

a non-straight scrolling movement of said scene is intentionally created on said matrix;
the amplitude of said scrolling movement is at least equal to 5 pixels; and
the speed v of said scrolling movement complies with the following relation:

$$\frac{a}{2T} \leq v \leq \frac{\alpha}{2t},$$

in which a is the size of said pixels (i.e. the resolution of said imager) of said matrix and t is the integration time of the images by said imager.

Thus, by virtue of the present invention, by implementing a low-amplitude scrolling movement, preferably at least equal to 10 pixels, the uniform change is provided of the one or more pixels on which the image of an observed object of said scene is formed, which allows the formation of said temporal series of spatial measurement errors on each pixel to be prevented and thus allows the low-frequency component of the measurement noise of the imager to be reduced. Furthermore, the selected scrolling speed allows any blurring in the obtained image to be prevented since the distance covered during the integration time corresponds to less than half a pixel.

Advantageously, said scrolling movement forms a loop, which in particular is circular.

Said scrolling movement is obtained by controlling the orientation of the line of sight of said imager. Said line of sight can be fixed relative to said imager, whereas said imager is mounted in a mobile manner. By way of a variant, the imager is associated with a movable optical system, through which said matrix observes the scene and said imager is fixed, whereas said line of sight is rendered movable by means of said optical system.

The present invention further relates to a photosensitive imager operating in a time-rated manner at the frequency 1/T and comprising a matrix of photosensitive pixels observing a scene, said imager being noteworthy in that it comprises means for controlling the orientation of its line of sight in order to create a non-straight scrolling movement of said scene on said matrix, the amplitude of said scrolling movement being at least equal to 5 pixels and the speed v of said scrolling movement complying with the following relation:

$$\frac{a}{2T} \leq v \leq \frac{\alpha}{2t},$$

in which a is the size of said pixels of said matrix and t is the integration time of the images by said imager.

It is noteworthy that implementing the present invention is particularly advantageous in the case of a homing device intended for the final phase guidance of a missile towards a target. Indeed, for the obvious aforementioned cost reason, such a homing device comprises a low-cost and low-resolution photosensitive imager. This photosensitive imager thus has a high low-frequency measurement noise, which is particularly disadvantageous for the operation of the missile guidance system, which uses the images of the imager, due to the fact that this measurement noise is found in the pass-band of said guidance system. Filtering this noise would give slower guidance, which would prevent guidance towards fast or agile targets or short duration guidance operations.

Furthermore, applying the present invention to a homing device is even more advantageous as, in a known manner, the photosensitive imager thereof is already associated with an optical device for controlling the orientation of the line of sight of said imager that allows a target to be found in the observed scene.

Moreover, according to the invention, such a homing device is noteworthy in that said optical device for controlling the orientation of the line of sight of said imager, which is designed to find the target, is also used to create a non-straight scrolling movement of said scene on said matrix, the amplitude of said scrolling movement being at least equal to 5 pixels and the speed v of said scrolling movement complying with the following relation:

$$\frac{a}{2T} \le v \le \frac{\alpha}{2t},$$

in which a is the size of said pixels of said matrix and t is the integration time of the images by said imager.

As previously mentioned, said non-straight scrolling movement can form a preferably circular loop.

On the basis of the above, it is easy to understand that the present invention further relates to a missile comprising a guidance homing device of the aforementioned type.

Furthermore, it also can be understood that the parameters (amplitude, speed) of the scrolling according to the present invention can be variable over time according to the evolution of the parameters for forming the images by the imager (evolution of the integration time).

The figures in the accompanying drawings will explain how the invention can be realised. In these figures, similar elements have identical reference numerals.

FIG. 1 schematically shows a first embodiment of the method according to the invention.

Figure 2A:
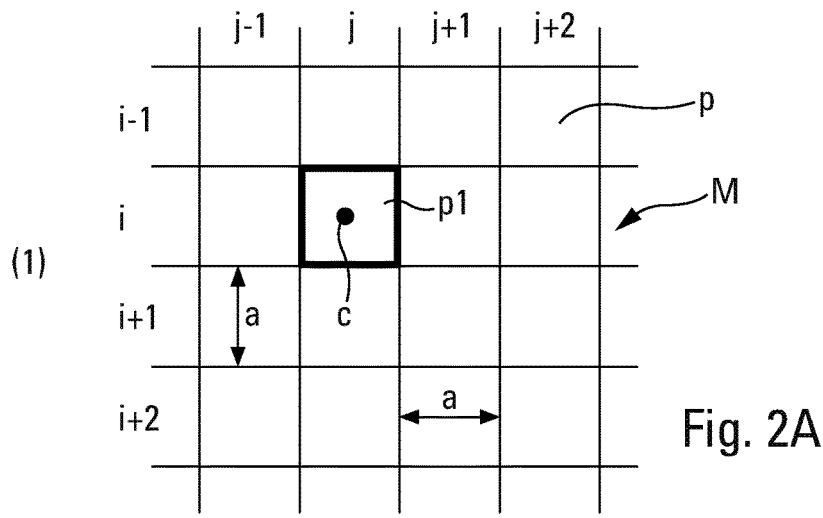
Figure 2B:
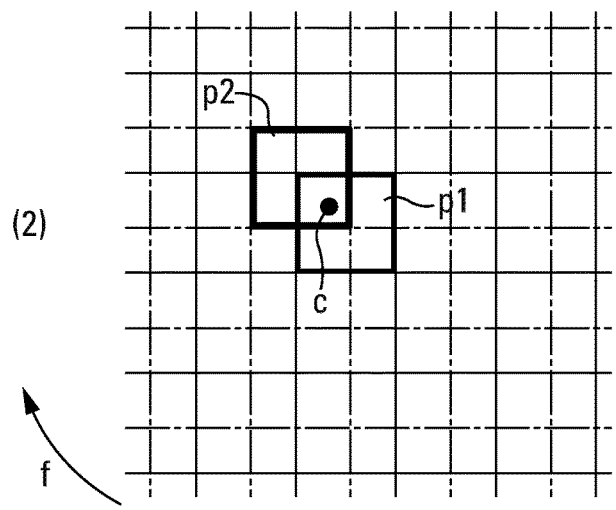
Figure 2C:
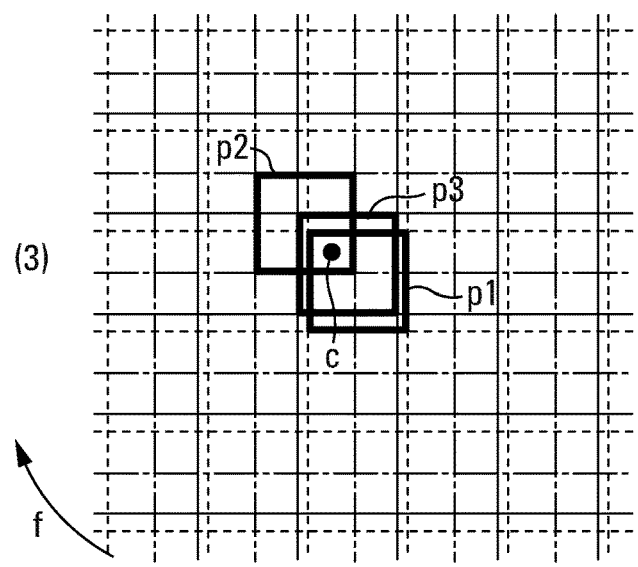

FIGS. 2A, 2B and 2C schematically explain the operating mode of the method according to the present invention.

Figure 3:
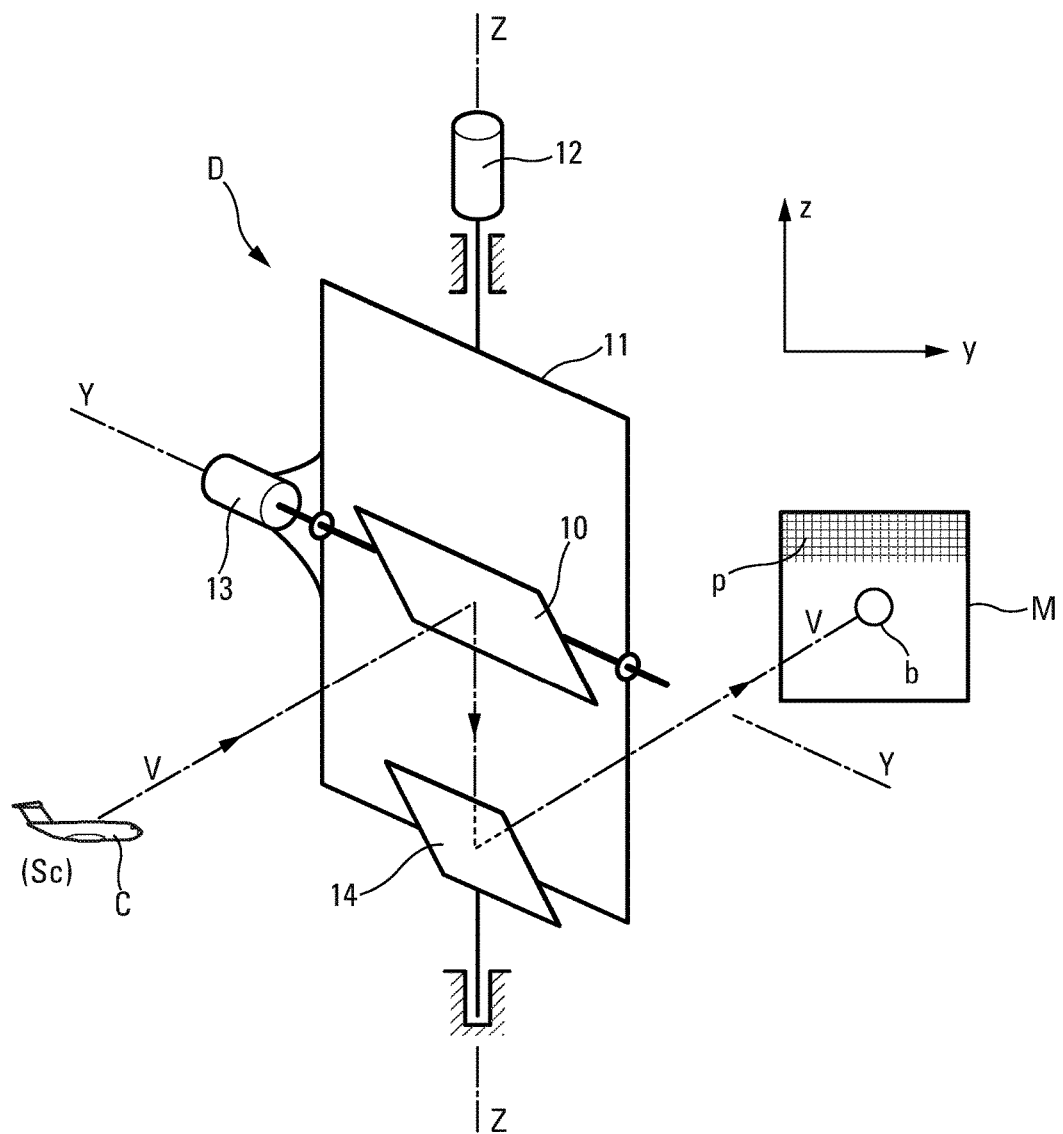

FIG. 3 schematically shows a second embodiment of the method according to the invention.

Figure 4:
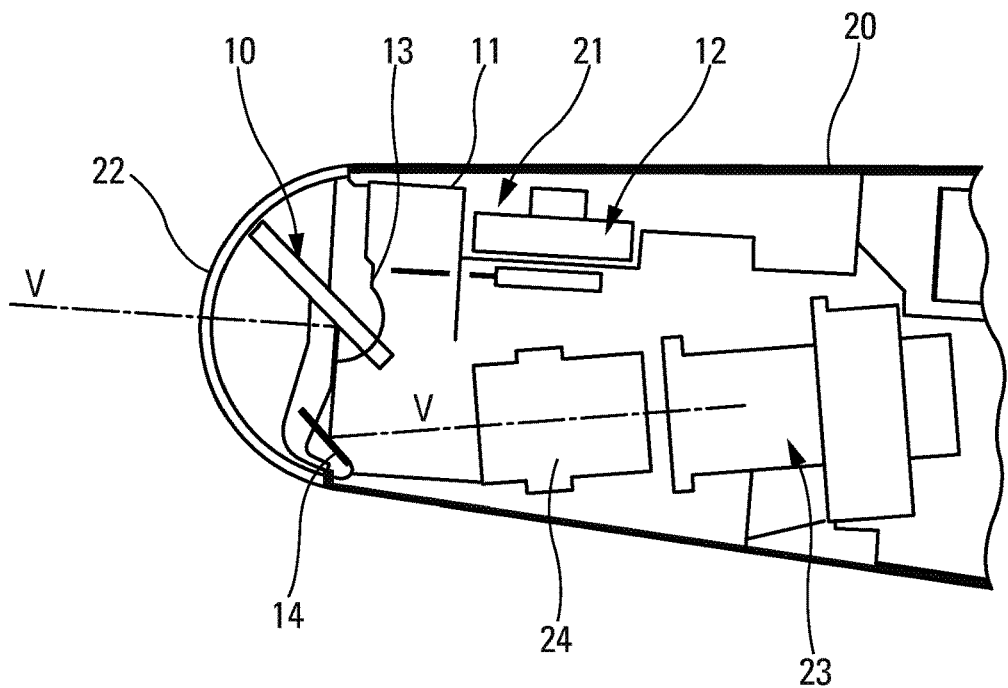

FIG. 4 schematically shows the front part of a missile provided with a homing device that can implement the present invention.

Figure 5A:
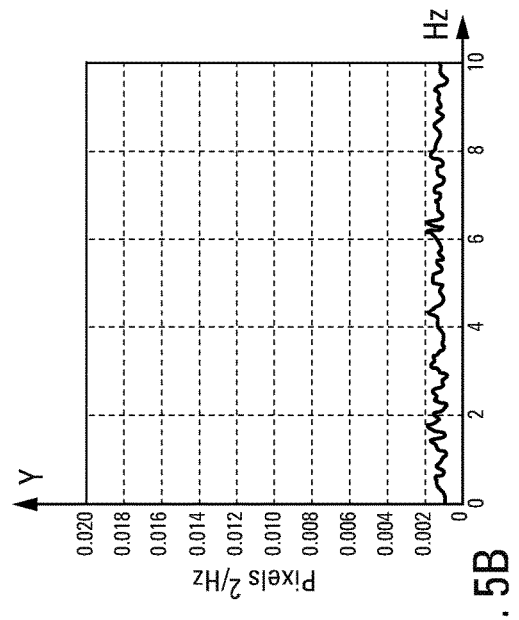
Figure 6A:
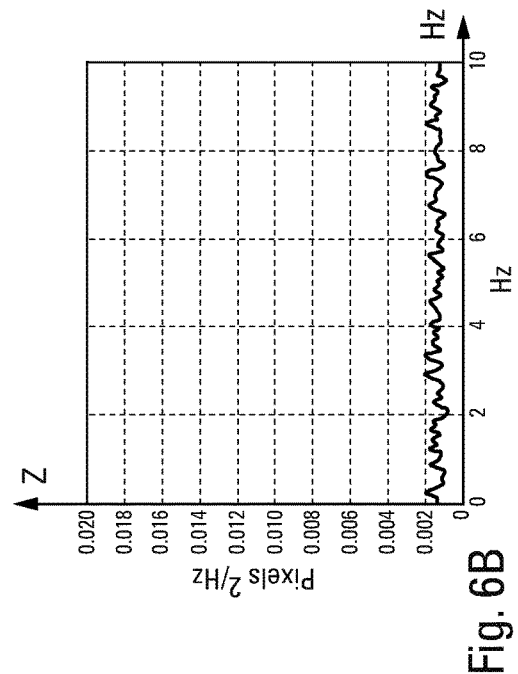

FIGS. 5A and 6A respectively show the spectral power densities of the measurement errors according to the frequency along two rectangular directions y and z parallel to the photosensitive matrix of the imager of the homing device of the missile of FIG. 4, in the event that the method according to the present invention is not implemented.

Figure 5B:
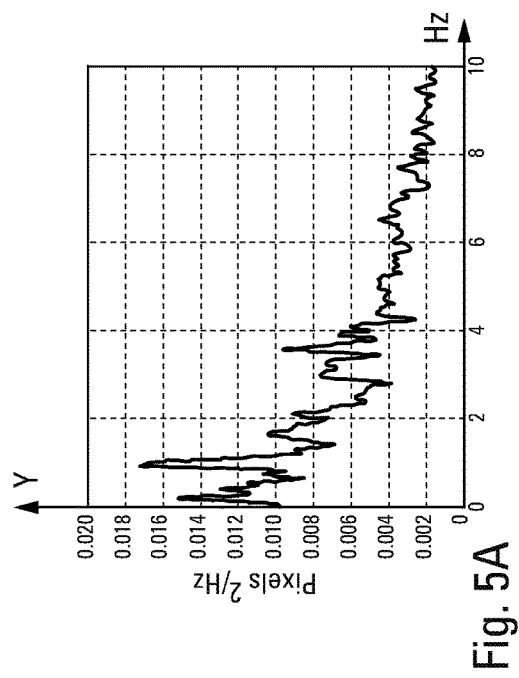
Figure 6B:
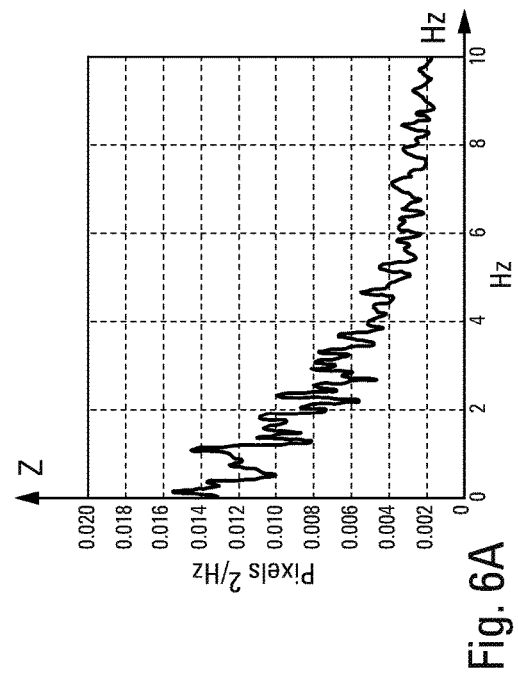

FIGS. 5B and 6B respectively show the spectral power densities of the measurement errors according to the frequency along said directions y and z, in the event that the method according to the present invention is implemented in the imager of the homing device of the missile of FIG. 4, with FIG. 5B having to be compared to FIG. 5A and FIG. 6B to FIG. 6A.

FIG. 1 schematically shows a photosensitive imager by its single photosensitive matrix M, said imager having a line of sight V-V and operating in a time-rated manner at a frequency 1/T. The photosensitive matrix M observes a target C found in the scene Sc. This photosensitive matrix M is made up of a plurality of photosensitive pixels p, which are divided into rows and columns and the size of which defines the resolution a of said matrix M (see FIG. 2A). For example, the rows of photosensitive pixels p are disposed horizontally (direction y), whereas the columns of said pixels are vertical (direction z).

The object of the present invention is to reduce the low-frequency component of the measurement noise of said imager.

To this end, in FIG. 1, with the photosensitive matrix M being assumed to be movable and the line of sight V-V being fixed relative to said matrix, a non-straight movement is imposed on said line of sight V-V, preferably a circular loop b, by making said photosensitive matrix M assume successive positions (1), (2), (3), etc., for which it remains parallel to itself. The scrolling of the scene Sc and of the target C on the photosensitive matrix M is thus generated.

The amplitude of this scrolling is at least equal to 5 pixels p (preferably at least equal to 10 pixels p) and the speed v of the scrolling complies with the following relation:

$$\frac{a}{2T} \le v \le \frac{\alpha}{2t},$$

in which t is the integration time of the images by the matrix M.

The diagrams of FIGS. 2A, 2B and 2C allow an intuitive understanding of how the present invention acts to reduce the low-frequency component of the measurement noise of the photosensitive matrix M. These Figs. show a highly magnified portion of said matrix.

In FIG. 2A, in which the matrix M is in a position (1), the image c of the target C is found in the pixel pij that is disposed at the intersection of the row i and the column j and that occupies the position p1. In this case, the information that is obtained is only that the image c of the target C is in the pixel pij in position p1, without indicating where this image is found in said pixel pij.

Under the effect of the scrolling according to the present invention, the matrix M moves, for example in the direction of the arrow f, and assumes the position (2) of FIG. 2B, such that the pixel pij assumes the position p2. In the example that is described, the image c remains in the pixel pij in position p2. However, by continuing the scrolling according to the present invention, the matrix M assumes, in the example shown, the position (3), such that now the image c appears in the pixel pi+1, j+1 in position p3.

Thus, the low-frequency noise of the matrix M is progressively improved by virtue of the scrolling imposed thereon since the formation of the aforementioned temporal series of spatial measurement errors is prevented, by progressively shifting the image c of the target C from one pixel to another.

It is easy to understand that, instead of moving the matrix M as shown above with reference to FIG. 1, it is comparable, and often more advantageous with respect to the implementation of the present invention, for the matrix M to be kept fixed and for the orientation of the line of sight V-V to be controlled.

An optical device D to this end is schematically shown in FIG. 3. This device D comprises a mirror 10, mounted on gimbals in order to be able to pivot about two rectangular axes, for example a horizontal axis Y-Y and a vertical axis Z-Z, said mirror 10 observing the target C in the scene Sc and thus defining a line of sight V-V. For example, the optical device D comprises a mounting 11, the orientation of which can be controlled about the axis Z-Z under the action of a motor 12, and the orientation of the mirror 10 can be controlled about the axis Y-Y, relative to the mounting 11, under the action of a motor 13 rigidly connected thereto. Furthermore, a mirror 14, rigidly fixed to the mounting 11, is disposed so as to provide the continuity for the line of sight V-V to the matrix M.

Therefore, by controlling the motors 12 and 13, it is possible for the scene Sc to be scrolled on the matrix M under the same conditions as those shown with reference to FIG. 1, 2A, 2B, 2C, in order to be able to reduce the low-frequency measurement noise of the matrix M.

It is noteworthy that the optical device D shown in FIG. 3 is already provided in known homing devices, not for the purposes of the present invention, but in order to find the target C in the scene Sc. In this case, it is particularly advantageous for the device D to be used both for finding the target C in the scene Sc and for reducing the low-frequency measurement noise of the photosensitive matrix of the imager of the homing device.

FIG. 4 shows the front part of a missile 20 comprising a homing device 21 provided with an optical device D similar to that of FIG. 3. For the sake of the clarity of the drawing, only individual elements of this device are visible, namely, the movable mirror 10 disposed behind the radome 22, the mounting 11, the fixed motor 12, the movable motor 13 and the deflecting mirror 14. The matrix M is not visible in the diagram of FIG. 4 as it is disposed inside an imager 23. Furthermore, in this diagram, an optical focusing device 24 is disposed between the deflecting mirror 14 and the imager 23.

If, without implementing the present invention, the spectral power densities of the measurement errors are measured in the directions Y and Z of the imager 23 operating at a time-rate 1/T of approximately 100 Hz, the results shown in FIGS. 5A and 6A are obtained, which show a significant low-frequency component.

Otherwise, if the optical device D of the homing device 21 is forced to scroll the scene Sc on the imager 23, for example in a circular manner at a linear speed of 0.6 pixel/image, the results shown in FIGS. 5B and 6B are obtained, which show the practical disappearance of the low-frequency component.

What is claimed is:

1. A method for reducing a low-frequency component of a measurement noise of a photosensitive imager, comprising:
generating a non-straight scrolling movement of a scene observed by a matrix of photosensitive pixels of a photosensitive imager, wherein the photosensitive imager operates in a time-rated manner at a frequency "1/T"; wherein an amplitude of said scrolling movement is at least equal to 5 pixels, and wherein a speed "v" of said scrolling movement complies with the following relation:

$$\frac{a}{2T} \leq v \leq \frac{\alpha}{2t},$$

in which "α" is a size of said pixels of said matrix and "t" is an integration time of images by said imager, wherein said scrolling movement is obtained by controlling an orientation of a line of sight of said imager, wherein controlling the orientation of the line of sight comprises reflecting the line of sight by a first mirror rotatably connected about a first axis to a mount optically disposed between the scene and the matrix and the mount rotatable about a second axis and further reflecting the line of sight to the matrix by a second mirror rigidly affixed to the mount and optically disposed between the first mirror and the matrix, and wherein said scrolling movement of the scene comprises rotating the first mirror about the first axis and holding the second mirror fixed relative to the first axis and rotating the first mirror and the second mirror about the second axis.

2. The method according to claim 1, wherein the amplitude of said scrolling movement is at least equal to 10 pixels.

3. The method according to claim 1, wherein the scrolling movement forms a loop.

4. The method according to claim 3, wherein the loop is approximately circular.

5. The method according to claim 1, wherein said scrolling movement provides a uniform change to one or more pixels of the matrix of an observed object; and measuring spatial error for the one or more pixels from the uniform change.

6. The method according to claim 1, further comprising: observing the scene via the matrix of photosensitive pixels of the photosensitive imager through an optical device implemented with the imager, wherein said imager is fixed and wherein said line of sight is rendered movable by means of said optical device.

7. A device, comprising:
a photosensitive imager comprising a matrix of photosensitive pixels; and
an optical device configured to controlling an orientation of a line of sight of said matrix of photosensitive pixels in observing a scene;
wherein the imager operates in a time-rated manner at a frequency 1/T; and
wherein the optical device creates a non-straight scrolling movement of said scene on said matrix of photosensitive pixels, an amplitude of said scrolling movement being at least equal to 5 pixels and a speed "v" of said scrolling movement complying with the following relation:

$$\frac{a}{2T} \leq v \leq \frac{\alpha}{2t},$$

in which "α" is a size of said pixels of said matrix and "t" is an integration time of images by said imager, wherein the optical device comprises a mount rotatable about a first axis relative to the matrix, a first mirror rotatably connected about a second axis to the mount and optically disposed between the scene and the matrix, and a second mirror rigidly affixed to the mount, and optically disposed between the first mirror and the matrix, and wherein said scrolling movement of the scene comprises rotating the first mirror about the first axis and holding the second mirror fixed relative to the first axis and rotating the first mirror and the second mirror about the second axis.

8. A system for a final phase guidance of a missile towards a target, comprising:
a homing device comprising:
a photosensitive imager operating in a time-rated manner at a frequency 1/T and comprising a matrix of photosensitive pixels observing a scene; and
an optical device configured to control an orientation of a line of sight of said imager in order to find a target in said scene;
wherein said optical device creates a non-straight scrolling movement of said scene on said matrix, an amplitude of said scrolling movement being at least equal to 5 pixels and a speed "v" of said scrolling movement complying with the following relation:

$$\frac{a}{2T} \leq v \leq \frac{\alpha}{2t},$$

in which "α" is a size of said pixels of said matrix and "t" is an integration time of images by said imager, wherein the optical device comprises a mount rotatable about a first axis relative to the matrix, a first mirror rotatably connected about a second axis to the mount and optically disposed between the scene and the matrix, and a second mirror rigidly affixed to the mount, and optically disposed between the first mirror and the matrix, and wherein said scrolling movement of the scene comprises rotating the first mirror about the first axis and holding the second mirror fixed relative to the first axis and rotating the first mirror and the second mirror about the second axis.

9. The system according to claim 8, wherein scrolling movement forms a circular loop.

10. The system according to claim 8, further comprising:
a missile comprising the homing device, wherein the missile is configured to use the homing device for a final phase guidance.

11. A method for reducing a low-frequency component of a measurement noise of a photosensitive imager, comprising:
generating a non-straight scrolling movement of a scene observed by a matrix of photosensitive pixels of a photosensitive imager, wherein the photosensitive imager operates in a time-rated manner at a frequency "1/T"; wherein an amplitude of said scrolling movement is at least equal to 5 pixels, and wherein a speed "v" of said scrolling movement complies with the following relation:

$$\frac{a}{2T} \le v \le \frac{\alpha}{2t},$$

in which "$\alpha$" is a size of said pixels of said matrix and "t" is an integration time of images by said imager, so as to provide a uniform change of one or more pixels of the matrix of photosensitive pixels on which an image of an observed object of said scene is formed to allow the low-frequency component of the measurement noise of the photosensitive imager to be reduced and so that a distance covered during the integration time corresponds to less than half a pixel, wherein the measurement noise being formed by a temporal series of spatial errors of position measurements, and wherein said scrolling movement of the scene comprises rotating a first mirror about a first axis and holding a second mirror fixed relative to the first axis and rotating the first mirror and the second mirror about a second axis.

\* \* \* \* \*